US005681642A

United States Patent [19]

Sugisaki et al.

[11] Patent Number: 5,681,642

[45] Date of Patent: Oct. 28, 1997

[54] ELECTROSTATIC RECORDING MATERIAL

[75] Inventors: Hiroji Sugisaki; Hiroshi Baba, both of Higashimatsuyama, Japan

[73] Assignee: Nippon Paper Industries Co., Ltd., Tokyo, Japan

[21] Appl. No.: 514,378

[22] Filed: Aug. 11, 1995

[30] Foreign Application Priority Data

Aug. 11, 1994 [JP] Japan .................................... 6-210469

[51] Int. Cl.$^6$ ........................................................ B32B 3/00

[52] U.S. Cl. .......................... 428/195; 428/212; 428/340; 428/423.1; 428/500; 428/502; 428/688

[58] Field of Search ................................ 428/195, 411.1, 428/913, 206, 207, 423.1, 500, 524, 480, 503, 688, 471, 340, 841, 212, 502

[56] References Cited

U.S. PATENT DOCUMENTS

| | | | |
|---|---|---|---|
| 3,634,135 | 1/1972 | Akiyama | 117/221 |
| 4,396,667 | 8/1983 | Sonoda et al. | 428/212 |
| 4,422,895 | 12/1983 | Shimura et al. | 156/633 |
| 4,429,000 | 1/1984 | Naka et al. | 428/265 |
| 4,931,359 | 6/1990 | Yagi et al. | 428/325 |
| 5,400,126 | 3/1995 | Cahill et al. | 355/278 |

FOREIGN PATENT DOCUMENTS

| | | |
|---|---|---|
| 2-106760 | 4/1990 | Japan . |
| 3-73973 | 3/1991 | Japan . |
| 6-102677 | 4/1994 | Japan . |

*Primary Examiner*—William Krynski
*Attorney, Agent, or Firm*—Oblon, Spivak, McClelland, Maier & Neustadt, P.C.

[57] ABSTRACT

An electrostatic recording material is disclosed, wherein, in the electrostatic recording material provided with a release layer on the electroconductive layer of electrostatic recording material and formed a dielectric layer having insulating resin and pigment as major components on the release layer, the image is peeled off from the release layer without carrying out water-washing operation to make out an adhesive electrostatic recording material for signboard application etc.

6 Claims, 2 Drawing Sheets

ELECTROSTATIC RECORDING MATERIAL

BACKGROUND OF THE INVENTION

The present invention relates to an electrostatic recording material, particularly, an electrostatic recording material suitable for the electrostatic plotter that outputs a color image in the CG (computer graphics) or CAD (computer aided design) system, and, more particularly, an electrostatic recording material used for the applications of outdoor signboards, external walls of buildings, shutter displays, electrodecorative signboards, etc. in combination with personal computer or scanner.

The electrostatic recording system using multineedle electrodes has been adopted for the output of drawing in the industrial sectors such as building, machine design, print substrate, metal mold design for plastics and mapping, from the fact that large-width and high-speed recording and output of designed drawing are possible due to the recent progress of CAD technologies such as design and simulation with computer.

In recent years, since the electrostatic recording system has developed remarkably into the sector of color recording and a high-speed and large-sized color image can be obtained easily, its application range is being magnified more and more.

Usual recording system of color electrostatic plotter includes the single path system provided with four multineedle electrode heads (cyan, magenta, yellow and black) and respective developing devices and the multipath system provided with one multineedle electrode and four developing devices corresponding to said respective colors. And, with the multipath system, a negative charge electrostatic latent image of first color is formed on a recording material generally with multineedle electrode head, this is developed with positive charge developer, then the recording material is restored once to the original position, and thereafter an electrostatic latent image of second color is formed on the same surface. Repeating the developing procedures for third color and fourth color similarly, a color image can be formed.

Now, recently, by combining the color plotter with personal computer or scanner, the application of electrostatic recording paper has been evolved for making out electrodecorative signboard, display, signboard, etc. The making-out process thereof (now in use) is as follows:

① To draw on the electrostatic recording paper with color electrostatic plotter, ② To laminate it with an adhesive film, ③ To peel off the electroconductive layer and paper base by washing in a large-sized water bath to leave behind the dielectric layer (material) image and film sheet, and ④ To laminate with an adhesive film onto the bottom side (two-side adhesive makes it possible to stick also onto a substrate as it is).

The electrostatic recording paper used commonly can be used as it is and a large-sized signboard can be made out through relatively simple process, but the removal of electroconductive layer and base by water-washing operation after laminated with adhesive film is difficult and the problems of effluent treatment etc. remain.

With the electrostatic recording material for signboard application etc., the operativity is poor upon removing the electroconductive layer and base by water-washing operation and additionally the problems of effluent treatment etc. remain. The removing operation by electroconductive layer and base that accompanies no water-washing operation is difficult and has been a theme for many years. Even if a film with strong adhesive force may be laminated and peeled off, toner in part of image can be copied, but it is impossible to transfer the image excellent in reproducibility. Moreover, change in heat or pressure on lamination has little effect, hence, in the present circumstances, there is only a technique to remove the electroconductive layer and base that dissolve into water by water-washing operation. Moreover, a method of directly forming the image on film by ink jet system etc. is also devised and put into practice, but it poses the problems of slow printing speed, poor weather resistance (light fastness), etc., hence, in such area, the demand of electrostatic recording paper that allows large-sized and high-speed printing is high.

The purpose of the invention is to provide an electrostatic recording material for signboard application etc., which has good recording property of image and which transfers the image onto adhesive film in a simplified manner (without water-washing operation).

The invention relates to an electrostatic recording material for signboard application etc., which has excellent color-recording characteristics of electrostatic recording material and which allows to omit the removing process of electroconductive layer and base by water-washing operation after lamination.

As a result of diligent studies, the inventors have found an electrostatic recording material easily peelable off without using water, by providing a release layer between recording layer (material) and electroconductive layer.

SUMMARY OF THE INVENTION

Disclosed is an electrostatic recording material characterized in that, in the electrostatic recording material provided with a dielectric layer having insulating resin and pigment as major components on an electroconductive supporter, a release layer is provided between the electroconductive supporter and the dielectric layer, and the peeling force between said dielectric layer and said release layer is within a range from 2.0 to 50 g/25 mm.

DETAILED DESCRIPTION OF THE INVENTION

Figures 1A, 1B, 1C, 1D:
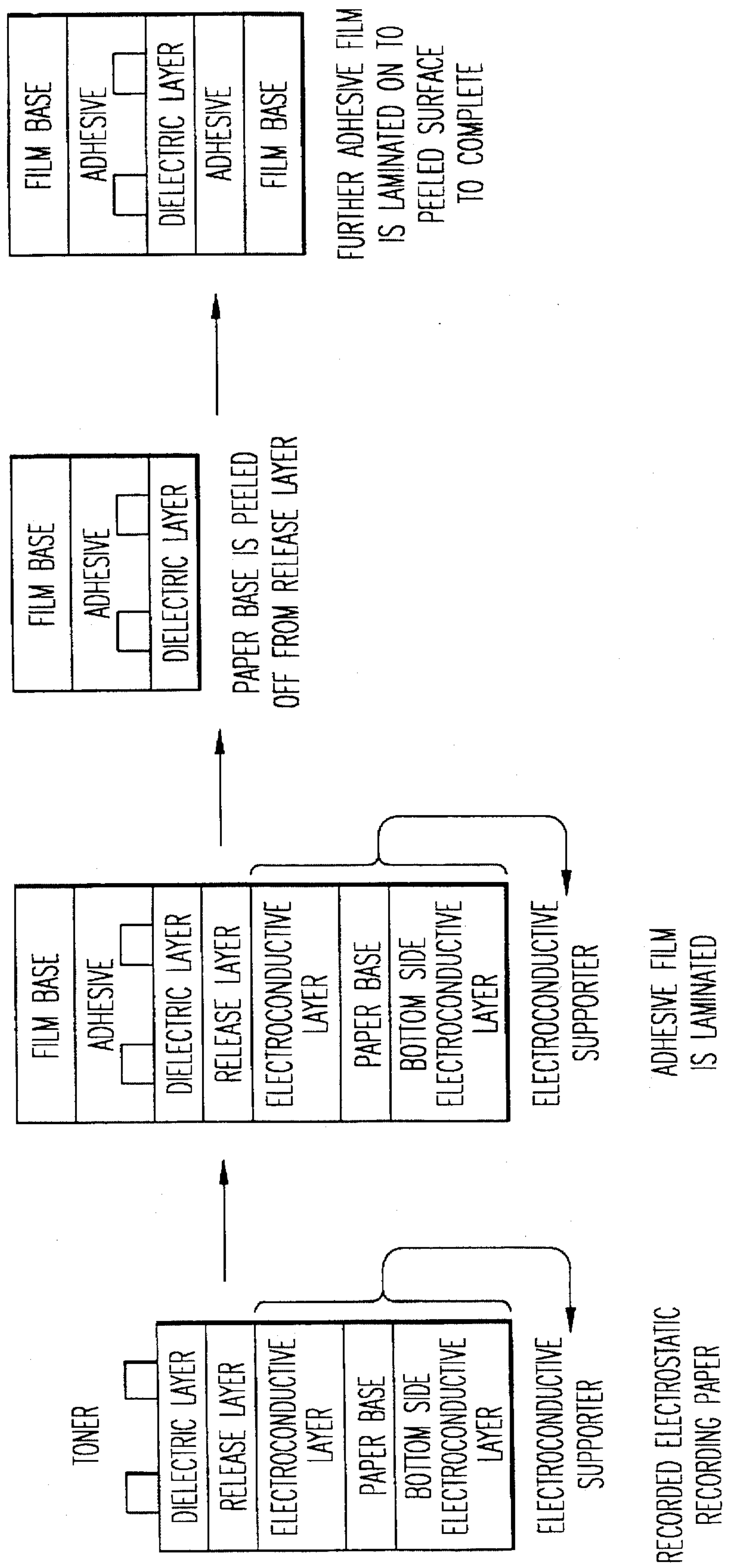
FIG. 1 is an illustrative diagram of operation process for manufacturing the inventive electrostatic recording material.
Figures 2A, 2B, 2C, 2D:
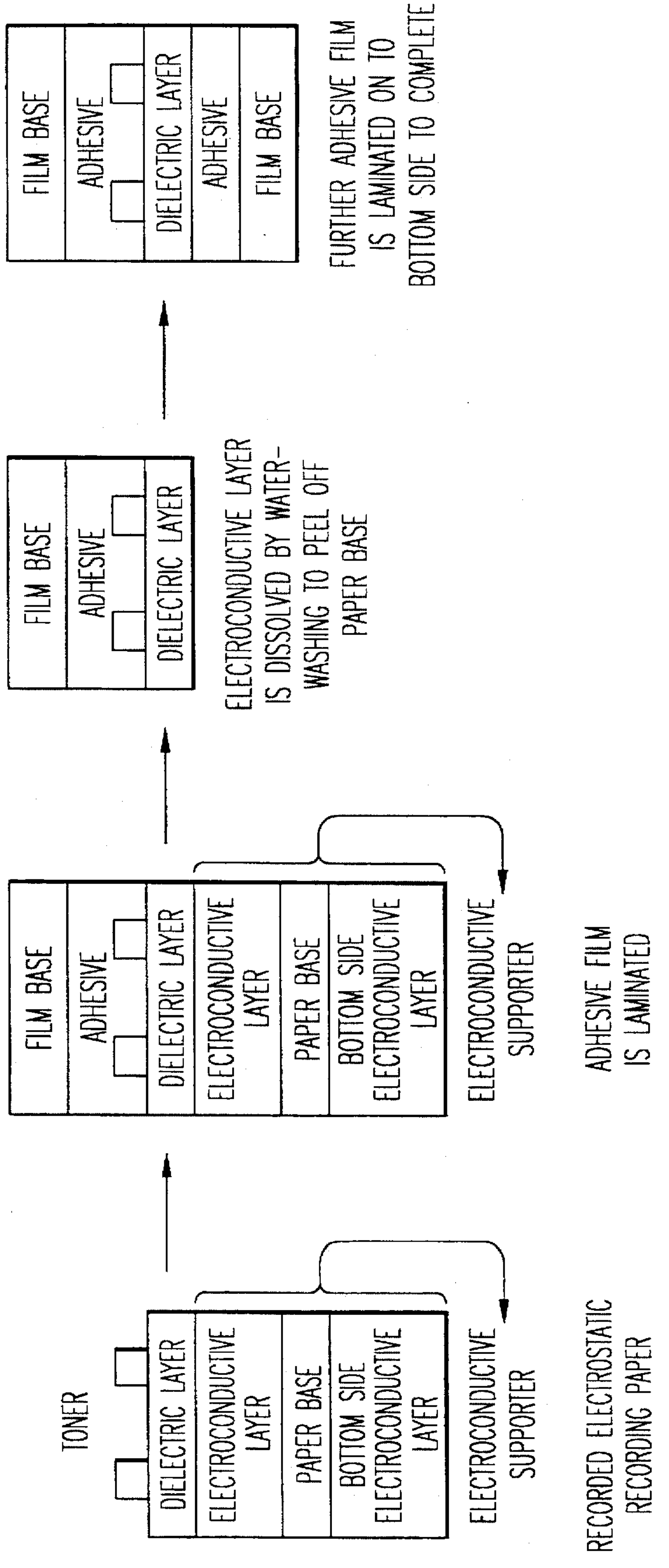
FIG. 2 is an illustrative diagram of operation process for manufacturing the conventional electrostatic recording material.

Since the imageability and the transferability vary depending on the type and attachment level of release layer, a fixed peeling force is required. Upon laminating the electrostatic recording paper (material) with adhesive sheet, the adhesive sheet must be adhered enough to the dielectric material (toner) to correctly transfer the image. On the other hand, easy peeling-off must be incurred between dielectric material and release layer to separate (remove) the electroconductive layer and base. A method of using a sheet coated with heat-fusible resin in place of adhesive sheet and adding heat of 100° to 130° C. through heat laminator was also investigated, but it showed significant curl by heat after peeling-off, leading to a trouble in use with poor practicality.

If the peeling-off between adhesive sheet and electroconductive layer and base is heavy, then the image is not transferred enough and the remnant of image generates. Also, if the peeling-off is too light, then the dielectric material is rubbed with the recording head (multineedle electrode) of color electrostatic plotter upon drawing with plotter and the dielectric layer is stripped off. It is needed therefore to control the peeling force when sticking the adhesive sheet and releasing it from the dielectric layer and release layer and, by establishing the value within a range from 2.5 to 50 g/25 mm, the electrostatic recording material being the purpose of the invention can be provided.

In the invention, as a result of extensive investigations, for the release materials to control the peeling force, it is possible to select appropriately for use among sole solution of alkyd type resin, urethane type resin, melamine type resin or the like, or the mixed solutions mixed them. The attachment level to form the release layer is preferable to be 2.0 $g/m^2$ to 8.0 $g/m^2$ in dry weight and particularly preferable to be 3.0 $g/m^2$ to 5.0 $g/m^2$ from the relationship between the image characteristics of electrostatic recording material and the releasability after sticking of adhesive sheet.

Moreover, in the inventive electrostatic recording material, the insulating resin that constitutes the dielectric layer is not particularly restricted and acrylic resin, polyester resin, vinyl chloride resin, vinyl acetate, styrene-acrylic copolymer, butyral resin or the like being publicly-known resin hitherto can be used solely or by mixing two or more kinds appropriately.

As for the pigments, too, oxides, hydroxides, carbonates, sulfates and halogen compounds of zinc, titanium, magnesium, calcium, aluminum, etc. and inorganic powders such as silica, alumina, kaolin and calcined kaolin being publicly known hitherto can be mentioned.

As the supporters for the inventive electrostatic recording material, any of materials that are known to be used for electrostatic recording material can be used. As such materials, papers such as wood-free paper, white machine-glazed paper, one-side glazed paper, glassine paper and rein-impregnated paper can be mentioned, and further use of plastic films such as polyester film, polyolefin synthetic paper, metal foil, etc. is possible.

The electroconductive layer to be formed on the supporter is formed using high-molecular electrolytes, for example, cationic high-molecular electrolytes such as poly (vinylbenzyltrimethylammonium chloride) and poly (acryltrimethylammonium chloride) and anionic high-molecular electrolytes such as poly(styrenesulfonate and polyacrylate, electroconductive zinc oxide of electron-conductive type, tin oxide, etc.

Besides, as a matter of course, the peeling force between dielectric layer and release layer should be weaker than that between electroconductive layer and release layer.

The substrate of adhesive sheet to be laminated is preferable to be a UV-absorptive film that is transparent and excellent in the weather resistance (light fastness) and concretely plastic sheets such as polyester, poly(ethylene terephthalate), polypropylene, triacetate and polycarbonate can be mentioned. The thickness is not particularly restricted, but is suitable to be 25 to 150 μm. This transparent UV-absorptive sheet is either a sheet that was added internally with UV absorber into resins such as polypropylene resin, poly(ethylene terephthalate) resin, triacetate resin, polycarbonate resin and polyester resin and then converted to film in the sheet shape, or a sheet that was formed by coating a mixed solution of publicly known UV absorber (e.g. benzotriazole type) and resin with excellent adhesion to transparent sheet (e.g. polyester resin) onto the transparent sheet and then drying. In particular, a sheet with absorbance of 1.0 or more at a wave length of 360 nm is preferable to be used as a supporter. Moreover, when laminating the second adhesive sheet, if using a white film, the product may be used for signboard application etc. and, if using a transparent adhesive sheet, it may be utilized for electro-decorative application etc. In particular, as for the second adhesive sheet, the substrate etc. are not particularly restricted. The adhesive to be used for these adhesive sheets is one used for publicly known adhesive film, which is not particularly restricted.

In following, the examples will be shown to concretely illustrate the invention, but the invention is not confined to these examples, of course. Moreover, part in the examples indicates part by weight.

EXAMPLE 1

Preparation of electroconductive supporter

Onto a wood-free paper with basis weight of 55 $g/m^2$, Chemistat 7300 (from Sanyo Chemical Industries, Ltd.) being a cationic high-molecular electrolyte was coated in dry weight of 4.0 $g/m^2$ on top side and 2 $g/m^2$ on bottom side, followed by drying, which was subject to smoothing treatment through supercalender to obtain an electroconductive supporter (hereinafter abbreviated as A base) with surface smoothness (Oken method) of 300 sec.

Making-out of electrostatic recording paper

Onto the top side of said supporter, a coating liquor for release layer comprising following composition was coated and dried in dry weight of 4.0 $g/m^2$.

| | |
|---|---|
| Aminoalkyd resin Tespeel TA31-113 (Hitachi Chemical Polymer Co., Ltd.) | 100 parts |
| Aminoalkyd resin Tesfine 322 (Hitachi Chemical Polymer Co., Ltd.) | 1 part |
| Curing agent (p-toluenesulfonic acid) Drier 900 (Hitachi Chemical Polymer Co., Ltd.) | 5 parts |
| Toluene | 100 parts |
| Ethyl acetate | 100 parts |

Further, onto the release layer, a coating liquor to form dielectric layer comprising following composition was coated and dried so as the dry Weight to become 4.0 $g/m^2$ to obtain an electrostatic recording material.

| | |
|---|---|
| Styrene-acrylic copolymer resin Dianal LR-338 (Mitsubishi Rayon Co., Ltd.) | 100 parts |
| Calcium carbonate Lyton A (Bihoku Funka Kogyo K.K.) | 90 parts |
| Silica Aerosil R-972 (Nippon Aerosil Co., Ltd.) | 10 parts |
| Toluene | 300 parts |

EXAMPLE 2

Similarly to Example 1, the electroconductive supporter (A base) was made out and, onto the supporter, the coating liquor for release layer was coated and dried so as the dry weight to become 5.0 $g/m^2$, then the dielectric layer was formed similarly to Example 1 to obtain an electrostatic recording material.

EXAMPLE 3

Similarly to Example 1, the electroconductive supporter (A base) was made out and, onto the supporter, the coating liquor for release layer was coated and dried so as the dry weight to become 3.0 g/m$^2$, then the dielectric layer was formed similarly to Example 1 to obtain an electrostatic recording material.

EXAMPLE 4

Similarly to Example 1, the electroconductive supporter (A base) was made out and, onto the supporter, the coating liquor for release layer was coated and dried so as the dry weight to become 6.0 g/m$^2$, then the dielectric layer was formed similarly to Example 1 to obtain an electrostatic recording material.

EXAMPLE 5

Similarly to Example 1, the electroconductive supporter (A base) was made out and, onto the supporter, the coating liquor for release layer was coated and dried so as the dry weight to become 2.0 g/m$^2$, then the dielectric layer was formed similarly to Example 1 to obtain an electrostatic recording material.

COMPARATIVE EXAMPLE 1

Except that PVA (poly(vinyl alcohol)) was used in place of two types of aminoalkyd resins in the coating liquor for release layer in Example 1, similar procedure was conducted to obtain an electrostatic recording material.

COMPARATIVE EXAMPLE 2

Except that coating and drying were made so as the dry attachment level of release layer in Example 1 to become 1.0 g/m$^2$, similar procedure was conducted to obtain an electrostatic recording material.

COMPARATIVE EXAMPLE 3

Except that coating and drying were made so as the dry attachment level of release layer in Example 1 to become 9.0 g/m$^2$, similar procedure was conducted to obtain an electrostatic recording material.

COMPARATIVE EXAMPLE 4

Except that no release layer in Example 1 was coated, similar procedure was conducted to obtain an electrostatic recording material (electrostatic recording material now in use).

Respective electrostatic recording materials obtained were subject to conditioning process to make the moisture content 6.0±1.0 in terms of Moistrex moisture meter.

These were evaluated for the image using color electrostatic plotter (CE-3436 machine) from Versatec Corp., and further, after an adhesive film for lamination (Naska YP Lamination Film II) was pressed under pressure at ambient temperature through laminator, the peeling property was evaluated. And, these results are shown in Table 1.

Evaluation Method

A. Recording density . . . measured on black recording area with Macbeth reflection densitometer.

B. Uniformity of solid area . . . Visually evaluated the white missing spots in solid recording area.

C. Hair line missing . . . Number of dot missings along hair lines of total length of 1 m.
- o. . . 0–10
- Δ. . . 11–20
- x . . . More than 20

D. Abnormal electric discharge . . . Number of abnormal dots along hair lines of total length of 1 m.
- o. . . 0–20
- Δ. . . 21–40
- x . . . 41 or more E. Peeling force . . . A peeling force when peeling off the dielectric layer from release layer after sticked and laminated the adhesive sheet.

F. Remnant of image . . . Remnant of image after peeled off the adhesive sheet (visual evaluation).
- o. . . Image can be copied completely.
- Δ. . . Part of image remains.
- x . . . Much of image remains.

G. Peeling-off (removal) of dielectric layer on recording with color electrostatic plotter
- o. . . No removal
- Δ. . . Partial removal
- x . . . Much removal

TABLE 1

| | A | B | C | D | E | F | G |
|---|---|---|---|---|---|---|---|
| Example 1 | 1.38 | O | O | O | 16.4 | O | O |
| Example 2 | 1.34 | O | O | O | 8.5 | O | O |
| Example 3 | 1.40 | O | O | O | 23.2 | O | O |
| Example 4 | 1.30 | O | O | O | 2.8 | O | O |
| Example 5 | 1.39 | O | O | O | 41.8 | O | O |
| Comparative example 1 | 1.05 | Δ | X | Δ | 157.8 | X | O |
| Comparative example 2 | 1.42 | O | O | O | 60.5 | Δ~X | O |
| Comparative example 3 | 1.02 | O | X | O | 1.8 | O | X |
| Comparative example 4 | 1.40 | O | O | O | — | — | O |

*Since the conventional method of Comparative example 4 is a method of removing the electroconductive layer and paper base by water-washing operation after laminated the adhesive film, the evaluation of E and F items was impossible.

◇ Test items A, B, C, D and G are evaluations after drawing with color electrostatic plotter, and E and F are evaluations after laminated the adhesive sheet.

As described above, with the inventive electrostatic recording material, in place of the process of removing electroconductive layer and paper base by water-washing operation after laminated the adhesive film for signboard application etc. a method of removing electroconductive layer and paper base by peeling off the adhesive film after transferred the dielectric layer and image (toner) onto it has been found by providing with a release layer. The invention exerts excellent effects also in the imageability, peelability, etc., makes it possible to use the adhesive sheet used in the conventional water-washing method as it is, and can provide an electrostatic recording material for signboard etc. in very simplified manner without carrying out the process of water-washing operation. Moreover, because of the elimination of the process of water-washing operation, the problem of effluent treatment also disappears.

What is claimed is:

1. An electrostatic recording material comprising a dielectric layer having an insulating resin and pigment as major components on an electroconductive supporter, further comprising a release layer provided between the electroconductive supporter and the dielectric layer, wherein the peeling force between the dielectric layer and the release layer is weaker than the peeling force between the electroconductive supporter and the release layer, and wherein the peeling force between the dielectric layer and the release layer is within a range from 2.5 to 50 g/25 mm.

2. The recording material of claim 1, wherein the release layer comprises an alkyd resin, a urethane resin, a melamine resin or a mixture thereof.

3. The recording material of claim 2, wherein the amount of the release layer is 2.0–8.0 g/$m^2$.

4. The recording material of claim 3, wherein the amount of the release layer is 3.0–5.0 g/$m^2$.

5. The recording material of claim 1, wherein the electroconductive supporter comprises poly (vinylbenzyltrimethylammonium chloride) or poly (acryltrimethylammonium chloride).

6. The recording material of claim 1, wherein the electroconductive supporter comprises poly(styrenesulfonate), polyacrylate, electroconductive zinc oxide or tin oxide.

* * * * *